US005621535A

United States Patent [19]
Heyl

[11] Patent Number: 5,621,535
[45] Date of Patent: Apr. 15, 1997

[54] DIRECT DIGITAL SYNTHESIS OF VIDEO SIGNAL RECORDING WAVEFORMS FROM BASEBAND DIGITAL SIGNALS PROVIDED BY A COMPUTER INTERFACE FOR COMPATIBLE RECORDING ONTO ANALOG VIDEO TAPE

[75] Inventor: Lawrence F. Heyl, Mountain View, Calif.

[73] Assignee: Apple Computer, Inc., Cupertino, Calif.

[21] Appl. No.: 403,534

[22] Filed: Mar. 14, 1995

Related U.S. Application Data

[63] Continuation of Ser. No. 115,402, Sep. 1, 1993, abandoned.
[51] Int. Cl.[6] .................................................. H04N 9/79
[52] U.S. Cl. .................................. 386/26; 386/34
[58] Field of Search ................................ 358/310, 328, 358/320, 330, 327; 348/441, 443, 446, 449, 450, 453, 552, 659, 660, 663; H04N 9/79, 9/89

[56] References Cited

U.S. PATENT DOCUMENTS

| 4,266,241 | 5/1981 | Hjortzberg | 358/328 |
| 4,580,173 | 4/1986 | Dischert et al. | 358/328 |
| 4,816,898 | 3/1989 | Farley et al. | 348/453 |
| 4,831,463 | 5/1989 | Faroudja | 358/310 |
| 4,884,151 | 11/1989 | Ohtsu et al. | 358/330 |
| 5,062,004 | 10/1991 | Winterer et al. | 358/328 |
| 5,233,435 | 8/1993 | Hong | 358/315 |
| 5,245,428 | 9/1993 | De With et al. | 358/335 |
| 5,255,081 | 10/1993 | Miyamoto et al. | 348/453 |

OTHER PUBLICATIONS

S. Mehrgardt, "Noise Spectra of Digital Sine–Generators Using the Table–Lookup Method," IEEE Trans. Acoustics, Speech and Signal Processing, vol. ASSP–31(4), Aug. 1983, pp. 1037–1039.

J. Volder "The CORDIC Trigonometric Computing Technique," IRE Trans. on Electronic Computers, Sep. 1959, pp. 330–334.

H. Samueli, "An Improved Search Algorithm for the Design of Multiplierless FIR Filters with Powers–of–Two Coefficients," IEEE Trans. Circuits and Systems, 36(7), Jul. 1989, pp. 1044–1047.

H. Shaffeu, M. Jones, H. Griffiths, and J. Taylor, "Improved Design Procedures for Multiplierless FIR Digital Filters," Electronics Letters, 27(13), 20 Jun. 1991, pp. 1142–1144.

"Report 624–4, Characteristics of Television Systems," Reports of the CCIR, 1990, pp. 1–33.

*Helical–scan Video Tape Cassette System Using 12.65 mm (0.5 in) Magnetic Tape on Type VHS.* IEC Standard 774, First Edition, 1983.

Y. Nagaoka, M. Tsurata, and H. Fujiwara, "High Performance VTR Based on the S–VHS Format," IEEE Trans. Consumer Electronics, 34(3), Aug. 1988, pp. 560–565.

*Helical–scan Video tape Cassette System Using 8 mm Magnetic Tape–Video 8,* IEC Standard 843, first edition, 1987.

K. Tsuneki, T. Ezaki, and Y. Kubota, "Development of the High–Band 8mm Video System", IEEE Trans. Consumer Electronics, 35(3), Aug. 1989, pp. 436–441.

*Primary Examiner*—Thai Q. Tran
*Attorney, Agent, or Firm*—David J. Larwood

[57] ABSTRACT

The present invention is a system for recording digitized component television signals onto analog video tape. The present invention directly implements the frequency division multiplexed signal of a VCR, and avoids many of the artifacts of composite television signal encoding. An additional benefit of digital processing is the ability to realize video filters with two dimensional isotropic response, which allows for smear compensation.

23 Claims, 3 Drawing Sheets

DIRECT DIGITAL SYNTHESIS OF VIDEO SIGNAL RECORDING WAVEFORMS FROM BASEBAND DIGITAL SIGNALS PROVIDED BY A COMPUTER INTERFACE FOR COMPATIBLE RECORDING ONTO ANALOG VIDEO TAPE

This is a continuation of application Ser. No. 08/115,402, filed Sep. 1, 1993, now abandoned.

BACKGROUND OF THE INVENTION

The present invention relates generally to the recording of video signals, and more particularly to the conversion and recording of digitized baseband component video signals such as red, green, and blue (RGB) or any of its linear transformations (e.g., YUV or YIQ).

Specialized combinations of computer hardware and software, such as QuickTime® by Apple Computer, Inc., allow users to create and edit video movies using a combination of video, graphics, and sound data. Each frame of a movie exists in a digitized baseband component format, which allows the images to be stored and manipulated by a computer. While the digitized format is ideal for creating and editing movie frames on a computer, this format is not compatible with video cassette recorders (VCRs) which require a composite television signal (usually NTSC or PAL) input.

As is well known to those skilled in the art, NTSC and PAL composite television signals are recorded using frequency modulation of the luminance (Y) component, which is then used as the AC bias signal for the down converted QAM encoded chrominance components. Quadrature amplitude modulation encoding, or QAM, is the suppressed carrier amplitude modulation of two subcarriers in quadrature (I and Q for NTSC, or U and V for PAL). The signal parameters of these and other composite television standards can be found in "Report 624-4, Characteristics of Television Systems," Reports of the CCIR, 1990, pp. 1–33.

Prior practice for converting and recording digitized component video signals onto analog video tape has been to convert the digitized components into RGB analog components, encode them to form a composite television signal, and then apply this composite signal as input to a video cassette recorder (VCR). Common consumer VCR standards are VHS, S-VHS, Video-8, and Hi8. The parameters of VHS are defined in Helical-scan Video Tape Cassette System Using 12.65 mm (0.5 in) Magnetic Tape on Type VHS. IEC Standard 774, First Edition, 1983. The parameters of S-VHS (a proprietary system of JVC) are defined in a paper by Y. Nagaoka, M. Tsurata, and H. Fujiwara entitled "High Performance VTR Based on the S-VHS Format," IEEE Trans. Consumer Electronics, 34(3), August 1988, pp. 560–565. The parameters of Video-8 are defined in Helical-scan Video tape Cassette System Using 8 mm Magnetic Tape—Video 8, IEC Standard 843, first edition, 1987. The parameters of Hi8 (a proprietary system of Sony Corporation) are defined in a paper by K. Tsuneki, T. Ezaki, and Y. Kubota entitled "Development of the High-Band 8 mm Video System", IEEE Trans. Consumer Electronics, 35(3), Aug. 1989, pp. 436–441.

All four VCR systems described above require a composite television signal input which is processed for recording by separating the luminance and encoded chrominance components. These signals are then further encoded for video recording. The luminance signal is applied to an FM modulator, and the encoded chrominance is down-converted to a lower subcarrier frequency. All of the video recording systems use a frequency division multiplex approach where encoded luminance and chrominance occupy separate well defined bands, with strict requirements as to modulated signal bandwidth.

Artifacts commonly associated with composite television signal encoding are cross-chroma and cross-luma (together generically called cross-color) and smear. Cross-color is caused by crosstalk between luminance and chrominance signals. This problem is often quite severe on synthetic imagery, such as graphics. Smear is caused by excessive delay between different channels, and is corrected through the use of matched analog filters and delay lines. Each stage of the process described above (analog component generation, composite television signal encoding, and video recording) is typically accomplished with analog circuitry. This analog signal processing adds unavoidable noise and distortion to the recorded video signal.

Accordingly, an object of the present invention is to convert and record digitized component video signals onto analog video tape without first generating the associated composite television signals.

Another object of the present invention is to convert and record digitized component video signals onto analog video tape with fewer processing stages to suppress noise and distortion.

Still another object of the present invention is to convert and record digitized component video signals onto analog video tape using digital processing up to the final analog video recording stage to further suppress or eliminate noise and distortion.

Yet another object of the present invention is to convert and record digitized component video signals onto analog video tape avoiding cross-color artifacts associated with composite television signal encoding.

Still another object of the present invention is to convert and record digitized component video signals onto analog video tape while reducing analog related "smear" by digital processing.

Yet another object of the present invention is to convert and record digitized component video signals onto analog video tape while eliminating the drift, alignment, and calibration problems of a conventional analog implementation.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a system for recording digitized component television signals onto analog video tape by directly synthesizing the video signal recording waveform from the computer interface generated digitized component television signals. Such a system includes a digital color transformation matrix for generating a digital luminance signal, a first digital chrominance signal, and a second digital chrominance signal. A series of digital signal processing elements, coupled to the digital luminance signal, are used to generate a digital filtered and frequency modulated luminance signal. A second series of digital signal processing elements, coupled to the first and second digital chrominance signals, are used to generate a digital low pass filtered and amplitude modulated composite chrominance signal. These signals are combined, then converted into an analog composite recording signal compatible with a predetermined VCR standard, and capable of being recorded onto an analog video tape.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
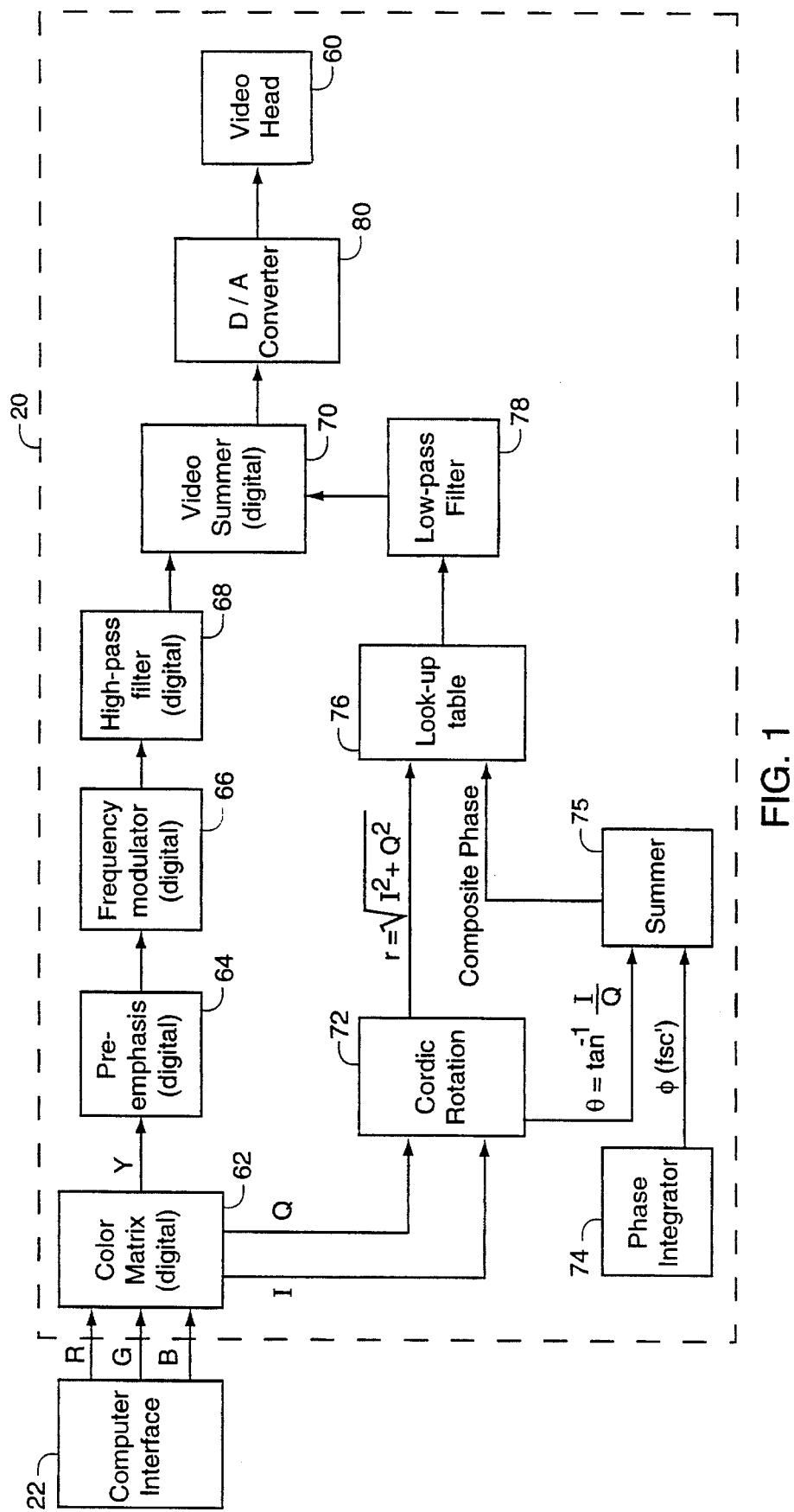
FIG. 1 shows a block diagram of a Video Signal Recording System according to the present invention.

The present invention will be described in terms of the preferred embodiment. The present invention is a Video Signal Recording System (VSRS) for converting and recording digitized component video signals onto analog video tape. Such a system is shown in FIG. 1. The VSRS is referred to by general reference numeral 20.

For purposes of this discussion, the use of VSRS 20 with digitized RGB baseband component signals and NTSC standard composite television signals will be explained. However, it will be apparent to those skilled in the art that VSRS 20 can be easily modified for use with any linear transformation of digitized RGB baseband component signals. It will also be apparent to those skilled in the art that VSRS 20 can be easily modified for use with the PAL composite television standard. Or with further modifications, VSRS 20 can be modified for use with other composite television standards. Also, common signal processing requirements well known in the art and disclosed in the various standards (e.g. synchronization pulses, color burst generation, signal delays, composite to component separation and demodulation, etc.) will not be discussed to avoid obscuring the present invention.

Figure 3:
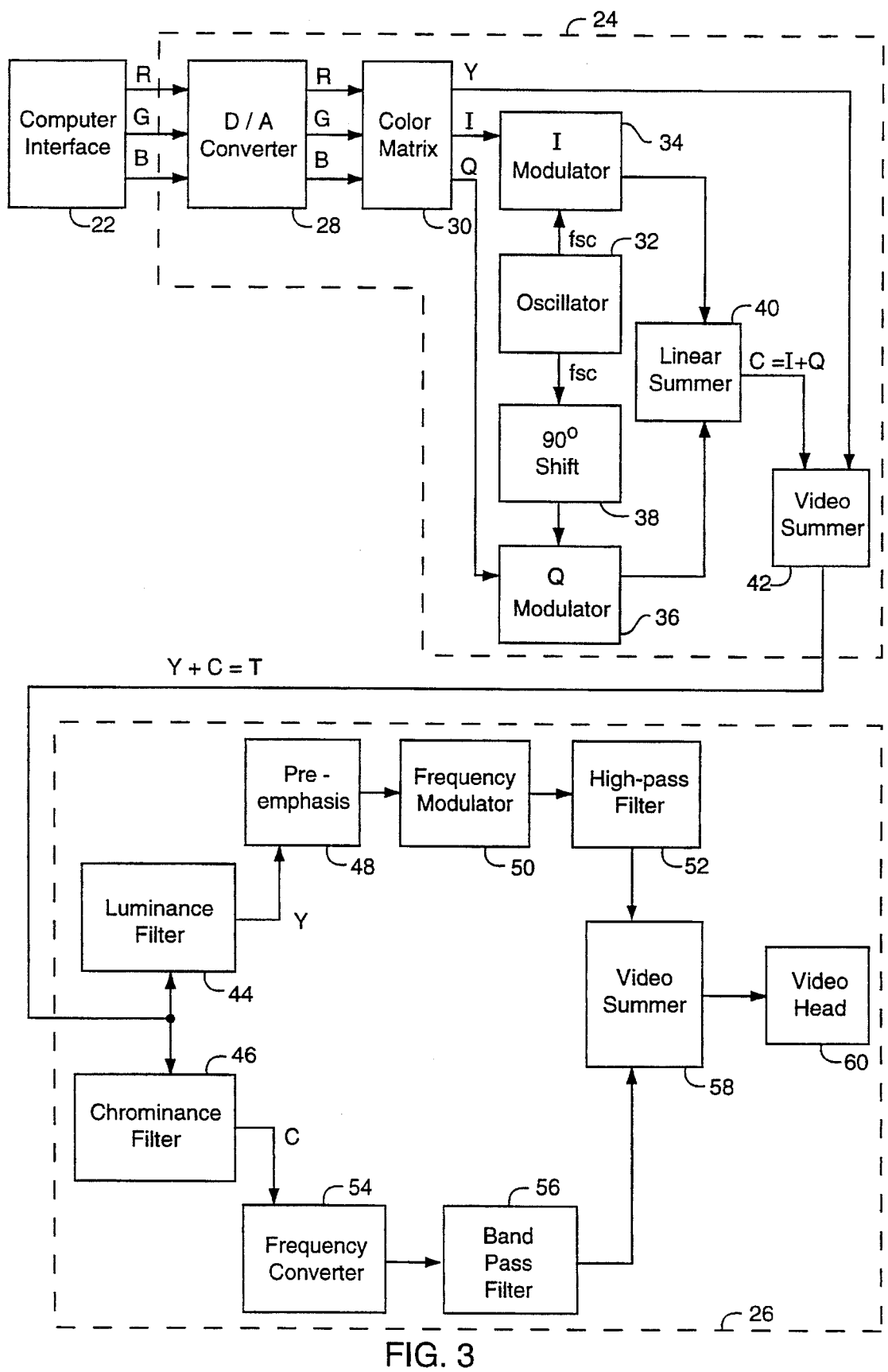
FIG. 3 shows a block diagram of a prior art system for converting and recording digitized component signals onto analog video tape.

Referring now to FIG. 3, a prior art system for converting and recording digitized component signals onto analog video tape is shown. The prior art system shown in FIG. 3 includes three main components: a computer interface 22 which provides digitized RGB component data representative of the frame or frames in a video movie; a composite television encoder (contained within dotted line 24); and a VCR (contained within dotted line 26).

Composite television encoder 24 includes a Digital to Analog (D/A) converter 28, which receives digitized RGB component data from computer interface 22. D/A converter 28 converts digitized RGB component data into analog RGB component data, which is used as an input by NTSC color transformation matrix 30. As is well known in the art, color transformation matrix 30 transforms analog RGB signals into YIQ color space signals, where Y, I, and Q are all functions of time and space, and:

Y=0.299R+0.587G+0.114B;

I=0.27(B−Y)+0.74(R−Y); and

Q=0.41(B−Y)+0.48(R−Y)

Next, the I and Q signals are used to modulate a subcarrier frequency $f_{sc}$, generated by an oscillator 32. In the NTSC standard, $f_{sc}$ is approximately 3.58 Mhz.

I modulator 34 receives the reference signal $f_{sc}$ from oscillator 32, and the analog I signal from color transformation matrix 30. Q modulator 36 receives the reference signal $f_{sc}$ (phase shifted 90° behind that received by I modulator 34) from oscillator 32 and 90° phase shifter 38. Q modulator 36 also receives as an input the analog Q signal from color transformation matrix 30. The modulated I and Q signals are generated by I modulator 34 and Q modulator 36, then added together in linear summer 40. Linear summer 40 generates a chrominance signal C, which is the phasor sum of the modulated I and Q signals. Mathematically, the modulated chrominance signal C equals:

$$I(t) \cos(2\pi f_{sc} t) + Q(t) \sin(2\pi f_{sc} t)$$

which also equals:

$$\sqrt{I^2(t) + Q^2(t)} \; e\left(-j2\pi f_{sc}t + \arctan\frac{I}{Q}\right)$$

where e is the base of the natural system of logarithms, and j is the square root of −1. This method of modulating and combining the I and Q signals to generate a C signal is called Quadrature Amplitude Modulation (QAM).

Signals Y and C are then added together in a video summer 42, which generates a total composite video signal T. It is this signal T that is then applied to VCR 26.

In VCR 26, luminance filter 44 is used to extract luminance signal Y from composite video signal T, and chrominance filter 46 is used to extract chrominance signal C from video signal T.

Next, luminance signal Y is modified for recording by a single-zero high pass pre-emphasis filter 48, then by frequency modulator 50, and finally by high pass filter 52, all of which are well known in the art.

Chrominance signal C is down converted (typically to a frequency of about 700 kHz, referred to as $f_{sc}'$) by frequency converter 54, and then filtered by band pass filter 56, as is also well known in the art. The modulated and frequency converted Y and C signals are then added together in a video summer 58, which generates a frequency division multiplexed output that drives a video recording head 60. As was mentioned above, the encoding, decoding, and extensive use of analog signal processing used in the prior art technique adds unavoidable cross-color, smear, noise, and distortion to the recorded signal.

Referring now to FIG. 1, a block diagram of a VSRS 20 according to the present invention is shown. Rather than performing all of the steps described above (converting digitized RGB signals to analog RGB component signals, encoding the analog RGB component signals into NTSC (or other composite) television signals, applying the signal as input to a VCR, decoding the composite television signal into Y and C components, then encoding again for recording), VSRS 20 directly computes the frequency division multiplexed recording waveform. Because VSRS 20 receives component video data, it is not necessary to compute the NTSC (or other composite) television signal, but only to compute the "NTSC-like" (or other composite) portions of the signal to be recorded. All of the signal manipulation is performed digitally, up until the final stage of recording the signal on tape.

VSRS 20 receives digitized RGB component data from computer interface 22. This RGB data is converted into digitized YIQ color space by digital color transformation matrix 62. Digital color transformation matrix 62 may be in the form of a look-up table to generate the single luminance and two chrominance signals. In an alternative embodiment of the present invention, computer interface 22 may generate digitized YIQ color space luminance and chrominance signals, eliminating the need for digital color transformation matrix 62.

Next, the signal processing of the luminance (Y) signal will be discussed. Digital pre-emphasis filter 64 receives as an input the luminance signal Y generated by color transformation matrix 62 (or computer interface 22, in an alternative embodiment). The single zero high pass filter required by all VCR formats may be implemented as a time domain digital filter, which may have two dimensional isotropic response.

The filtered luminance signal generated by pre-emphasis filter 64 is next used as an input by digital frequency modulator 66, which is used to generate an FM encoded luminance signal as required by the various VCR standards.

To generate the FM encoded luminance signal, the luminance stream is multiplied by a constant scale factor to set the FM deviation. A constant is then added to set the FM output frequency for a "zero" input level, corresponding to the negative tip of sync. The phase is integrated using an accumulator (not shown). For a constant phase input, the output sequence will have a period of the accumulator clock rate multiplied by the ratio of the phase to the accumulator word width. The output is a ramp which is not band limited. This ramp is used to address a look-up table (not shown) containing one cycle of a sine wave in order to generate a band limited output sequence. This method was discussed by S. Mehrgardt, in "Noise Spectra of Digital Sine-Generators Using the Table-Lookup Method," IEEE Trans. Acoustics, Speech and Signal Processing, Vol. ASSP-31(4), August 1983, pages 1037–1039.

After the luminance signal is FM encoded by frequency modulator 66, it is filtered by digital high-pass filter 68. The VCR standards require this high-pass filtering to prevent interference with encoded chrominance signals and, in the case of Video-8, with its FM encoded audio channel. High-pass filter 68 may be implemented by a digital filter using a finite impulse response (FIR) filter design whose tap weights are a single power of two shifts and adds. This technique has been discussed by H. Samueli, in "An Improved Search Algorithm for the Design of Multiplierless FIR Filters with Powers-of-Two Coefficients," IEEE Trans Circuits and Systems, 36(7), July 1989, pages 1044–1047; and by H. Shaffeu, M. Jones, H. Griffiths, and J. Taylor, in "Improved Design Procedures for Multiplierless FIR Digital Filters," Electronics Letters, 27(13), 20 Jun. 1991, pages 1142–1144. High pass filter 68 may also have two dimensional isotropic response.

The high-pass filtered luminance signal is then used as one input by digital video summer 70.

Next, the signal processing of the chrominance signals will be discussed. The prior art QAM technique described above applies I and Q baseband video to a modulator along with a subcarrier to generate a signal C, which equals:

$$I(t) \cos (2\pi f_{sc}t) + Q(t) \sin (2\pi f_{sc}t)$$

which can also be represented in polar form as:

$$\sqrt{I^2(t) + Q^2(t)} \ e\left(-j2\pi f_{sc}t + \arctan \frac{I}{Q}\right)$$

where $f_{sc}$ is the subcarrier frequency used in an NTSC (or other composite) television signal. As discussed above, VSRS 20 directly computes the waveform to be recorded by video head 60. Therefore, there is no need to amplitude modulate the subcarrier $f_{sc}$ and down convert to $f_{sc}'$. Instead, the VCR standard subcarrier frequency $f_{sc}'$ is modulated with the I and Q signals. This can be done digitally, as described below.

First, I(t) and Q(t) can be transformed from rectangular to polar coordinates by way of a CORDIC rotation. The CORDIC rotation was first described by J. Volder in "The CORDIC Trigonometric Computing Technique," IRE Trans. on Electronic Computers, September 1959, pp. 330–334. The CORDIC rotation is a digital technique used in solving the trigonometric relationships involved in conversion from rectangular to polar coordinates. The phasor sum of I and Q in polar coordinates would have two components: a length r(I,Q), which equals:

$$\sqrt{I^2 + Q^2}$$

and an angle Θ(I,Q) which equals:

arctan I/Q.

A CORDIC rotation device 72 receives as input the digital I and Q signals generated by digital color transformation matrix 62 (or computer interface 22 in an alternative embodiment). The outputs r(I,Q) and Θ(I,Q) are then further processed to generate the frequency converted C signal. The Θ signal acts as a phase offset for a conventional phase integrator frequency synthesizer 74. Phase integrator frequency synthesizer 74 generates an output signal, Φ($f_{sc}'$), which is representative of the phase and frequency of subcarrier $f_{sc}'$. Φ($f_{sc}'$) and Θ(I,Q) are added together in summer 75, which generates a composite phase signal. The composite phase signal and the r(I,Q) signal are applied to a look-up table 76 that generates a weighted phasor output, which is the frequency converted C signal. This scheme is a reduced complexity alternative to direct implementation of an analog QAM encoder.

Next, the frequency converted C signal is low pass filtered by a digital low pass filter 78, which may have two dimensional isotropic response. Digital video summer 70 then receives as an input the filtered C signal generated by low pass filter 78. Video summer 70 adds the Y and C signals together, which is then applied as an input to D/A converter 80. D/A converter 80 next converts the digital input signal to an analog output signal, which is applied to video head 60 to cause recording onto a video tape (not shown).

Figure 2:
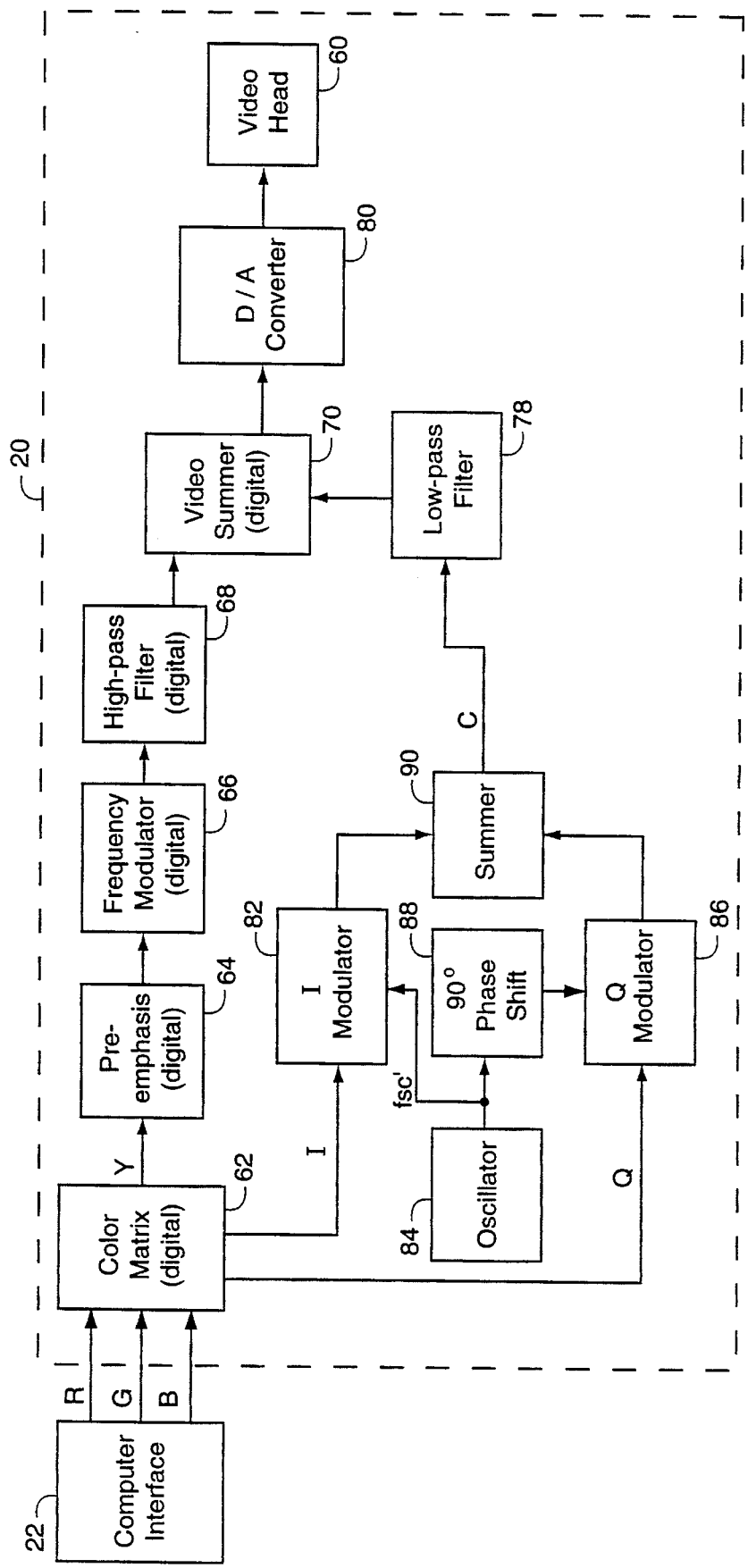
FIG. 2 shows a block diagram of a Video Signal Recording System according to an alternative embodiment of the present invention.

Referring now to FIG. 2, a block diagram of an alternative embodiment of VSRS 20 is shown. Instead of using the CORDIC rotation signal processing technique described above with respect to FIG. 1, the alternative embodiment shown in FIG. 2 uses a modified digital version of the standard QAM encoding technique described above with respect to FIG. 3.

Digital I modulator 82 receives the VCR standard subcarrier signal $f_{sc}'$ from an oscillator 84, and the digital I signal from digital color transformation matrix 62 (or computer interface 22 in an alternative embodiment). Digital Q modulator 86 receives the signal $f_{sc}'$ (phase shifted 90° behind that received by digital I modulator 82) from oscillator 84 and 90° phase shifter 88. Digital Q modulator 86 also receives as an input the digital Q signal from digital color transformation matrix 62 (or computer interface 22 in an alternative embodiment). The modulated I and Q signals generated by digital I modulator 82 and digital Q modulator 86 are then added together in a summer 90. Summer 90 generates a digital chrominance signal C, which is the phasor sum of the modulated I and Q signals. Digital chrominance signal C is then filtered by digital low pass filter 78. All other signal processing performed in the embodiment shown in FIG. 2 is identical to that described above with respect to FIG. 1.

In summary, VSRS 20 directly implements the frequency division multiplexed signal of a VCR, and avoids the artifacts of composite television signal encoding. An additional benefit of digital processing is the ability to realize video filters with two dimensional isotropic response, which allows for smear compensation.

The present invention has been described in terms of a preferred embodiment. The invention, however, is not limited to the embodiment depicted and described. Rather, the scope of the invention is defined by the appended claims.

What is claimed is:

1. A system for converting and recording digitized baseband component television signals onto analog video tape by directly synthesizing a video signal recording waveform, comprising:

an interface for receiving the digitized baseband component television signals from a computer;

a digital signal processor connected to said interface;

said digital signal processor generating a digitized video signal recording waveform from the digitized baseband component television signals for recording onto the video tape;

a digital-to-analog converter for converting said digitized video signal recording waveform into an analog video signal recording waveform compatible with a predetermined VCR standard, and capable of being recorded onto said analog video tape; and means for applying said analog video signal recording waveform to said analog video tape, said means for applying not including any modulators, demodulators, encoders or decoders; and wherein said digital signal processor and said computer interface do not include in their signal path an analog to digital converter, encoder circuitry for generating a composite television signal, nor a decoder for separating luminance and chrominance components of a single composite television signal.

2. The system of claim 1 wherein said digital signal processor includes:

means for generating a digital filtered and frequency modulated luminance signal from a digital luminance signal;

means for generating a digital amplitude modulated composite chrominance signal from a first digital chrominance signal and a second digital chrominance signal;

means for low pass filtering said digital amplitude modulated composite chrominance signal, to generate a digital low pass filtered and amplitude modulated composite chrominance signal; and means for combining said digital low pass filtered and amplitude modulated composite chrominance signal with said digital filtered and frequency modulated luminance signal, to generate a digital recording signal.

3. The system of claim 2 wherein said digital signal processor further includes means for generating said digital luminance signal, said first digital chrominance signal and said second digital chrominance signal from said digitized component television signals.

4. The system of claim 1 wherein said digital signal processor includes:

a first digital signal processing sub-system, coupled to a digital luminance signal, for generating therefrom a digital filtered and frequency modulated luminance signal;

a second digital signal processing sub-system, coupled to first and second digital chrominance signals, for generating therefrom a digital low pass filtered and amplitude modulated composite chrominance signal; and means for combining said digital low pass filtered and amplitude modulated composite chrominance signal with said digital filtered and frequency modulated luminance signal, and for generating therefrom a digital recording signal.

5. The system of claim 4 wherein said first digital signal processing sub-system includes:

a digital pre-emphasis filter, coupled to said digital luminance signal, for generating a digital high-pass filtered luminance signal;

a digital frequency modulator, coupled to said digital high pass filtered luminance signal, for generating a digital frequency modulated luminance signal; and a high pass filter, coupled to said digital frequency modulated luminance signal, for generating said digital filtered and frequency modulated luminance signal.

6. The system of claim 4 further including a digital color matrix, which is connected to said computer interface, for generating said digital luminance signal, said first digital chrominance signal, and said second digital chrominance signal.

7. The system of claim 4 wherein said second digital signal processing sub-system includes:

a CORDIC rotation device, coupled to said first and said second digital chrominance signals, for computing a phasor sum of said first and said second digital chrominance signals, and for generating a first output signal, representative of the magnitude of said phasor sum, and a second output signal, representative of the phase angle of said phasor sum;

a phase integrator for generating a composite phase output signal which is a combination of the phase and frequency of a predetermined subcarrier and said second output of said CORDIC rotation device;

a look up table, coupled to said composite phase output signal and said first output signal of said CORDIC rotation device, for generating a digital amplitude modulated composite chrominance signal; and a digital low pass filter, coupled to said digital amplitude modulated composite chrominance signal, for generating said digital low pass filtered and amplitude modulated composite chrominance signal.

8. The system of claim 4 wherein said second digital signal processing sub-system includes:

a digital oscillator for generating a predetermined subcarrier signal and a 90° phase shifted subcarrier signal;

a first amplitude modulator, coupled to said predetermined subcarrier signal and said first digital chrominance signal, for generating a first digital amplitude modulated chrominance signal;

a second amplitude modulator, coupled to said 90° phase shifted subcarrier signal and said second digital chrominance signal, for generating a second digital amplitude modulated chrominance signal;

means for combining said first digital amplitude modulated chrominance signal and said second digital amplitude modulated chrominance signal and for generating therefrom a digital amplitude modulated composite chrominance signal; and a digital low pass filter, coupled to said digital amplitude modulated composite chrominance signal, for generating said digital low pass filtered and amplitude modulated composite chrominance signal.

9. The system of claim 4 wherein said predetermined VCR standard is VHS.

10. The system of claim 4 wherein said predetermined VCR standard is S-VHS.

11. The system of claim 4 wherein said predetermined VCR standard is Video 8.

12. The system of claim 4 wherein said predetermined VCR standard is Hi8.

13. The system of claims 9, 10, 11 or 12 wherein said digital luminance signal, and said first and second digital chrominance signals are compatible with NTSC.

14. The system of claims 9, 10, 11 or 12 wherein said digital luminance signal, and said first and second digital chrominance signals are compatible with PAL.

15. The system of claim 1 wherein said digitized component television signals are red, green, and blue digital signals.

16. The system of claim 1 wherein said digitized component television signals are Y, I, and Q digital signals.

17. The system of claim 1 wherein said digitized component television signals are Y, U, and V digital signals.

18. The system of claim 5 wherein said pre-emphasis filter is a single zero high pass filter.

19. The system of claim 18 wherein said high pass filter is a finite impulse response digital filter whose tap weights are a single power of two shifts and two adds.

20. The system of claim 19 wherein said pre-emphasis filter and said high pass filter have two dimensional isotropic response.

21. The system of claims 7 or 8 wherein said low pass filter has two dimensional isotropic response.

22. A method for synthesizing a video signal recording waveform for recording onto analog video tape comprising the steps of:

supplying digitized baseband component television signals to a computer interface;

if said digitized baseband component television signals are not a digital luminance signal, and first and second digital chrominance signals, generating said digital luminance signal, said first digital chrominance signal, and said second digital chrominance signal from said digitized baseband component television signals, without composite television signal encoding or decoding, said digital luminance signal,, said first digital chrominance signal, and said second digital chrominance signal compatible with a predetermined composite television signal standard;

generating a digital filtered and frequency modulated luminance signal from said digital luminance signal;

computing a phasor sum of said first and said second digital chrominance signals;

generating a magnitude signal, representative of the magnitude of said phasor sum;

generating a phase signal, representative of the phase angle of said phasor sum;

generating a composite phase signal which is a combination of the phase and frequency of a predetermined subcarrier with said phase signal;

generating a digital amplitude modulated composite chrominance signal from said composite phase signal and said magnitude signal;

low pass filtering said digital amplitude modulated composite chrominance signal, to generate a digital low pass filtered and amplitude modulated composite chrominance signal;

combining said digital low pass filtered and amplitude modulated composite chrominance signal with said digital filtered and frequency modulated luminance signal, to generate a digital recording signal;

converting said digital recording signal into an analog recording signal capable of being recorded onto an analog video tape without further modulation, demodulation, encoding, or decoding in accordance with a predetermined VCR standard; and recording said analog recording signal without further modulation, demodulation, encoding, or decoding.

23. A method for synthesizing a video signal recording waveform for recording onto analog video tape comprising the steps of:

supplying digitized baseband component television signals to a computer interface;

if said digitized baseband component television signals are not a digital luminance signal, and first and second digital chrominance signals, generating said digital luminance signal, said first digital chrominance signal, and said second digital chrominance signal from said digitized baseband component television signals, without composite television signal encoding or decoding, said digital luminance signal, said first digital chrominance signal, and said second digital chrominance signal compatible with a predetermined composite television signal standard;

generating a digital filtered and frequency modulated luminance signal from said digital luminance signal;

generating a digital amplitude modulated composite chrominance signal from said first digital chrominance signal and said second digital chrominance signal;

low pass filtering said digital amplitude modulated composite chrominance signal, to generate a digital low pass filtered and amplitude modulated composite chrominance signal; combining said digital low pass filtered and amplitude modulated composite chrominance signal with said digital filtered and frequency modulated luminance signal, to generate a digital recording signal;

converting said digital recording signal into an analog recording signal capable of being recorded onto an analog video tape without further modulation, demodulation, encoding, or decoding in accordance with a predetermined VCR standard; and recording said analog recording signal without further modulation, demodulation, encoding, or decoding.

* * * * *